United States Patent

[11] 3,633,180

[72] Inventor Wolfgang Pabst
Neu Isenburg, Germany
[21] Appl. No. 877,532
[22] Filed Nov. 17, 1969
[45] Patented Jan. 4, 1972
[73] Assignee Licentia Patent-Verwaltungs G.m.b.H.
Frankfurt am Main, Germany

[54] ERROR-DETECTING CIRCUIT FOR GRAPHIC-PROGRAMMING MATRIX

3 Claims, 2 Drawing Figs.

[52] U.S. Cl. .......... 340/172.5, 178/19
[51] Int. Cl. .......... G06f 3/00
[50] Field of Search .......... 340/172.5, 146.1, 166, 345; 178/18, 19

[56] References Cited

UNITED STATES PATENTS

| | | | |
|---|---|---|---|
| 2,718,633 | 9/1955 | Fennessy | 340/345 |
| 2,737,647 | 3/1956 | Oliwa | 340/345 |
| 3,399,401 | 8/1968 | Ellis et al. | 340/172.5 X |

*Primary Examiner*—Raulfe B. Zache
*Attorney*—Spencer & Kaye

ABSTRACT: A circuit for indicating the erroneous simultaneous contacting of two adjacent intersections of a matrix composed of two sets of conductive strips disposed adjacent and at right angles to one another, which circuit includes a plurality of AND elements each connected to two adjacent, parallel conductive strips for producing an output signal when both strips have been simultaneously contacted, and a further logic element connected to the outputs of all of the AND elements for producing an error indication whenever an output signal is produced by one of the AND elements.

Inventor:
Wolfgang Pabst

BY Spencer & Kaye
ATTORNEYS.

ERROR-DETECTING CIRCUIT FOR GRAPHIC-PROGRAMMING MATRIX

BACKGROUND OF THE INVENTION

The present invention relates to improvements in a graphic-programming device composed of an input matrix consisting of intersecting conductive paths, and a plurality of logic elements each associated with a respective pair of conductive paths. Such device is described in my copending U. S. Pat. application Ser. No. 755,178, filed Aug. 26, 1968.

In my previously disclosed graphic-programming device, the matrix field is constructed in the form of an input console which serves to produce electrical signals when positions are marked on a drawing surface provided with grid lines and positioned on the matrix field in such a manner that the grid lines of the drawing surface coincide with the lines of the intersecting conductive paths.

The input console consists, for example, of a copper laminated epoxy resin plate and the conductive paths for the one coordinate are produced, for example, by cutting separating grooves therein. The conductive paths here advisably are spaced 5 mm. apart with separating grooves approximately 0.8 mm. in width. The conductive paths for the other coordinate are formed from a copper coating on a synthetic elastic foil. The laminated sides of the epoxy resin plate and of the synthetic foil are arranged to face one another. The epoxy resin plate is provided with a set of threads of nylon or of a material such as those sold under the Trademarks Teflon and Perlon on which the synthetic foil rests so that the conductive paths which face one another can not come in contact with one another without external pressure. Only by local pressure is contact produced between crossing conductive paths and, due to the elasticity of the synthetic conductor foil, such contact immediately ceases as soon as the pressure is removed or decreased.

Each point of intersection in the grid of the drawing surface coincides with the region of intersection of a respective pair of intersecting conductive paths of the console. When a grid point is marked by the pressure of a suitable pen, one conductive path on the synthetic foil which is associated with one grid line coordinate direction is pressed against one conductive path on the epoxy resin plate which is associated with the other grid line coordinate direction and an electrical contact is produced.

If the pressure pen is inaccurately positioned, it is possible, under certain conditions, that two adjacent parallel conductive paths will be contacted, thus causing the electronic coding and control mechanism of the programming device to produce an erroneous indication for the grid line number. Thus, it is possible that the grid line number of the path adjacent the one to be marked is indicated due to such double contacting or that grid line intersections which are not adjacent to one another are indicated. Even if only the code combination of an adjacent grid line intersection is produced, this results in an error in the program.

SUMMARY OF THE INVENTION

It is a primary object of the present invention to eliminate such erroneous outputs due to the simultaneous contacting of two adjacent grid conductive paths.

This and other objects according to the invention are achieved by the provision of error-detecting means for use with a graphic-programming matrix composed of two sets of parallel, mutually isolated conductive strips disposed adjacent one another, with one set of strips extending transversely to the other set and being arranged so that a pressure applied at any point of the matrix will bring one strip of one set into contact with one strip of the other set, and a voltage supply connected to both sets of strips for applying reading currents thereto. The error-detecting means are arranged to provide an error indication whenever two adjacent strips of one set are contacted simultaneously by at least one strip of the other set.

The error-detecting means essentially include a plurality of logic elements each connected to one respective strip of one set for producing an output whenever the strip of the one set to which it is connected is being contacted by any strip of the other set, and a logic circuit connected to the outputs of the logic elements for producing an error indication signal whenever an output is being produced simultaneously by two of the logic elements.

DESCRIPTION OF THE PREFERRED EMBODIMENTS

Figure 1:
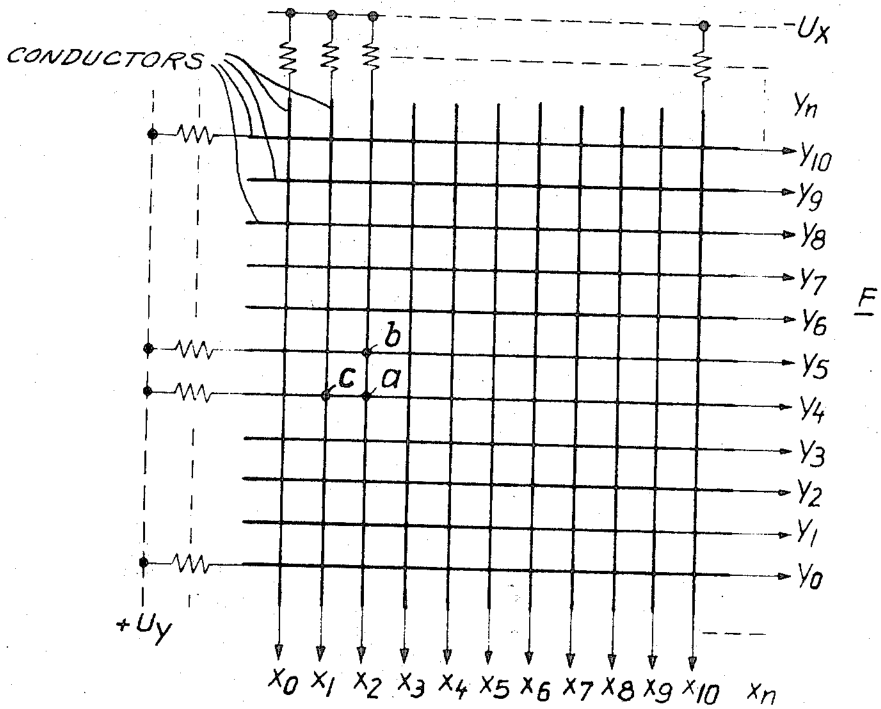
FIG. 1 is a circuit diagram of a graphic illustration matrix with which the present invention can be employed.

FIG. 1 shows a graphic-programming matrix F of the type with which the present invention may be employed. This matrix is composed of two crossing sets of parallel conductors, the parallel conductors $x_0$, $r_1$, $x_2$,...$x_{10}$...$x_n$ extending vertically and the parallel conductors $y_0$, $y_1$, $y_2$,...$y_{10}$...$y_n$ extending horizontally. The $x$-conductors are connected via respective resistors to a source of negative voltage $u_x$, while conductors $y$ are connected, also through respective resistors, to a source of positive voltage $u_y$. The magnitudes of $u_x$ and $u_y$ are preferably made equal to one another, or the values of the associated resistors are appropriately selected, to cause the voltage appearing at the contact point between two crossing conductors, when these conductors are made to contact one another, to be equal, or close, to 0. The voltages are emitted by a pulse generator (see the copending U. S. Pat. application Ser. No. 755,178) emitting during each timing period first to the conductors $x$ a negative voltage and to the conductors $y$ a positive voltage and subsequent to the conductors $x$ a positive voltage and to the conductors $y$ a negative voltage.

In order to determine the intersection point at which contact is being made at any given time, the output ends of the conductors are connected to suitable decoding circuitry. For example, this circuitry could be arranged to permit all of the $x$ conductors to be scanned to determine which conductor is at 0 voltage and to then permit all of the $y$ conductors to be scanned to similarly determine which conductor is at *0* potential. Since the manner in which such decoding is effected does not form any part of the present invention, decoding circuitry is not shown.

Figure 2:
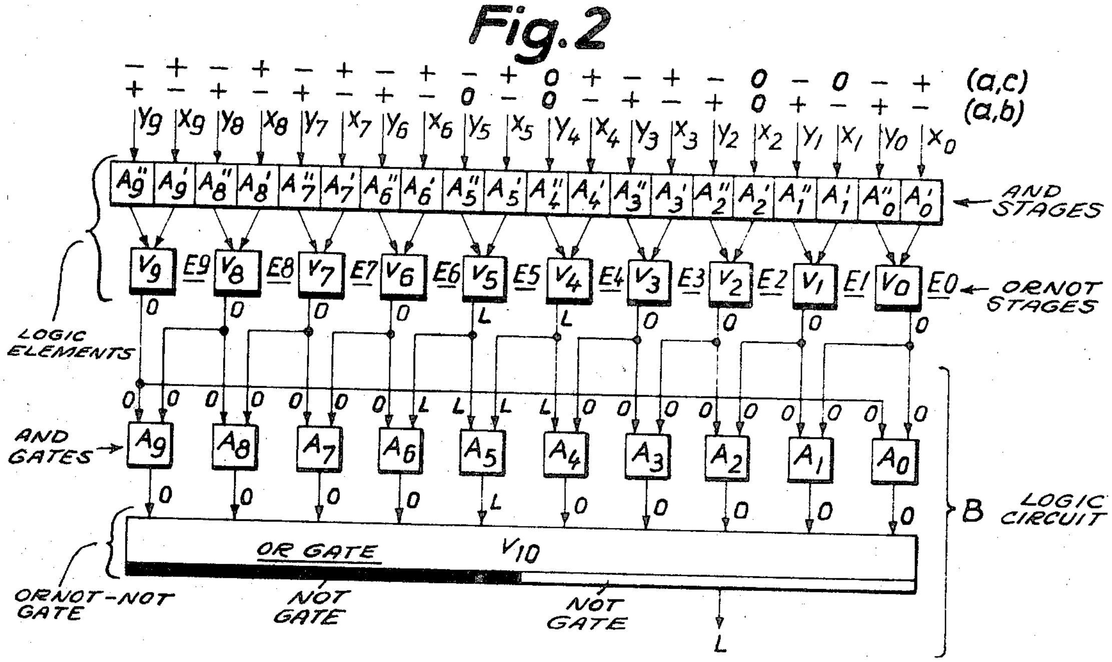
FIG. 2 is a schematic circuit diagram of one preferred embodiment of the invention.

Normally, only one pair of crossing conductors will be brought into contact at any given time and as long as this condition is fulfilled, no error indication will be required. However, if the marking pen should not be accurately placed, the conductors at two adjacent points of intersection *a* and *b* of the matrix might be brought into contact at the same time and this would produce an erroneous indication. FIG. 2 shows an error detecting circuit according to the invention for providing an indication whenever such situation arises.

The error detecting circuit of FIG. 2 includes, firstly, a plurality of logic elements E0, E1, E2, E3, E4, E5, E6, E7, E8 and E9. Each logic element is composed of two input AND stages A′ and A″, each AND stage also being identified by a subscript corresponding to the number of its associated logic element. Each logic element is further composed of an ORNOT stage *v*, each such stage also bearing a subscript corresponding to the number of its associated logic element.

Each logic element E has its A′ AND stage connected to a $x$ conductor of the matrix F and its AND stage A″ to a $y$ conductor of the matrix, and the AND stages A′ and A″ of each logic element being connected to those matrix conductors bearing the same reference numeral subscript as the associated logic element.

FIG. 2 shows the error detection circuitry associated with the first decade of a graphic-programming matrix, it being understood that a larger number of logic elements would be provided for a larger matrix.

In each logic element E, the AND stage A′ will receive either a negative voltage or a 0 voltage, the latter occurring when contact is being made between its associated $x$-conductor and any $y$-conductor of the matrix F. Similarly, each AND stage A″ will receive either a positive voltage or a 0 voltage, a 0 voltage appearing when the $y$-conductor to which it is connected is contacting any $x$-conductor of the matrix. The stages A′ and A″ are structurally identical and the output signals corresponding to the input signals.

Each logic element E is constructed, in a well-known manner, to produce an output signal having a value L (representing a binary "1") whenever a negative and 0 voltage or a 0 voltage and a 0 voltage is present at the inputs of both of its associated AND stages A′ and A″.

To provide an indication when an erroneous contact is established at two adjacent intersections of the matrix F, a logic circuit B according to the invention is connected to the logic elements E. The logic circuit B is composed of a plurality of AND gates $A_0$, $A_1$, $A_2$, $A_3$, $A_4$, $A_5$, $A_6$, $A_7$, $A_8$ and $A_9$ and an ORNOT NOT gate $v_{10}$ connected to all of the outputs of the gates A. The ORNOTNOT gate is composed of an OR gate represented by the box in which the symbol $v_{10}$ appears, a first NOt gate, represented by the black bar below the OR gate and having its input connected to the output of the OR gate, and a second NOT gate represented by the white bar below the OR gate and having its input connected to the output of the first-mentioned NOT gate. The output signal from the logic circuit B appears at the output of the last-mentioned NOT gate. Thus, the ORNOTNOT gate $v_{10}$ produces an OR signal which is negated twice to produce an output which is identical in nature with the output of the OR gate thereof. The two NOT gates are provided only for the purpose of amplifying the output signal from the OR gate. When the output from this latter gate has a sufficiently high amplitude to be used directly in further control circuitry, the two NOT gates need not be provided. The AND gates A are connected in the manner of a ring to the outputs two adjacent logic elements E and is arranged to produce an output signal having a value L only when a signal valve L appears at both of their inputs. Gate $v_{10}$ is connected to produce an output signal having a valve L whenever a signal having this valve appears at the output of any one of the gates A. Gate $A_0$ is connected to the outputs of element E9 and E0.

The output signal from gate $v_{10}$ can be applied in any known manner to block the reading of matrix F.

In the illustrated example, an erroneous contact is being made at two adjacent intersection points a and b of the matrix F. The voltages appearing at all of the inputs of stages A′ and A″ are illustrated. The erroneous double contacting produces a 0 potential on both lines $y_4$ and $y_5$, this resulting in the production of an output signal L by both of the adjacent logic elements E4 and E5. These two outputs constitute the two inputs to gate $A_5$. An output signal having a value L is produced by this gate and this results in the production of a blocking output having a value L by gate $v_{10}$.

It may be noted that a signal value L will appear at the output of one of the gates A only when a signal having this value is present at the outputs of both of the logic elements E connected to a single gate A. Supposing that an erroneous contact is being made at two adjacent intersection points $a$ and $c$ the double contacting produces a 0 potential on both lines $x_1$ and $x_2$ when the conductors $x$ are connected to the positive voltage and the conductors $y$ to the negative voltage of the pulse generator. This results in a production of an output signal L by both of the adjacent logic elements E1 and E2.

These two outputs constitute the two inputs to gate $A_2$ and an output signal L is produced by this gate and this results in an output signal L by gate $v_{10}$.

It will be understood that the above description of the present invention is susceptible to various modifications, changes and adaptations.

I claim:

1. Error-detecting means for use with a graphic-programming matrix composed of two sets of parallel, mutually isolated conductive strips disposed adjacent one another, with one set of strips extending transversely to the other set and being arranged so that a pressure applied at any point of the matrix will bring one strip of one set into contact with one strip of the other set, and a voltage supply connected to both sets of strips for applying reading currents thereto, said error-detecting means providing an error indication whenever two adjacent strips of one set are contacted simultaneously by at least one strip of the other set and comprising, in combination: a plurality of logic element means each connected to one respective strip of one said set for producing an output whenever the strip of said one set to which it is connected is being contacted by any strip of the other set; and logic circuit means connected to the outputs of said logic element means for producing an error indication signal whenever an output is being produced simultaneously by two of said plurality of logic element means which are adjacent one another.

2. An arrangement as defined in claim 1 wherein said logic circuit means comprises: a plurality of AND gates each having two inputs connected to the outputs of a respective adjacent pair of said logic element means; and an OR gate having a plurality of inputs connected to the outputs of all of said AND gates and an output at which appears an error indication signal.

3. An arrangement as defined in claim 2 wherein said voltage supply includes means to apply a positive polarity voltage to one said set of strips and a negative polarity voltage of the same amplitude to the other of said set of strips and vice versa so that when a strip of one set contacts a strip of the other set, a zero amplitude voltage is present on both said strips, and wherein each said logic element means includes means for producing an output whenever a zero voltage is present on its respective strip of said one set.

* * * * *